(12) United States Patent
Ranjan et al.

(10) Patent No.: US 12,063,163 B2
(45) Date of Patent: Aug. 13, 2024

(54) SENDING AND RECEIVING MESSAGES INCLUDING TRAINING DATA USING A MULTI-PATH PACKET SPRAYING PROTOCOL

(71) Applicant: Microsoft Technology Licensing, LLC, Redmond, WA (US)

(72) Inventors: Prashant Ranjan, San Jose, CA (US); Deepak Goel, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 414 days.

(21) Appl. No.: 17/552,685

(22) Filed: Dec. 16, 2021

(65) Prior Publication Data
US 2023/0198914 A1   Jun. 22, 2023

(51) Int. Cl.
*H04L 47/62*   (2022.01)
*G06N 3/08*    (2023.01)
*H04L 45/24*   (2022.01)
*H04L 45/50*   (2022.01)
*H04L 49/15*   (2022.01)

(52) U.S. Cl.
CPC ........... *H04L 47/6225* (2013.01); *G06N 3/08* (2013.01); *H04L 45/24* (2013.01); *H04L 45/50* (2013.01); *H04L 49/15* (2013.01)

(58) Field of Classification Search
CPC ........ G06N 3/044; G06N 3/0464; G06N 3/08; G06N 3/084; G06N 3/098; H04L 45/24; H04L 45/304; H04L 45/50; H04L 47/36; H04L 47/6225; H04L 49/15
USPC .......................................................... 370/329
See application file for complete search history.

(56) References Cited

U.S. PATENT DOCUMENTS

| | | | |
|---|---|---|---|
| 9,185,046 B2 * | 11/2015 | Ferguson | ............... H04L 45/60 |
| 10,686,729 B2 | 6/2020 | Sindhu et al. | |
| 10,922,250 B2 | 2/2021 | Caulfield et al. | |
| 10,965,586 B2 | 3/2021 | Goel et al. | |

(Continued)

OTHER PUBLICATIONS

Talal Anwar; Load Balancing Over Symmetric Virtual Topologies; IEEE Xplore (Year: 2017).*

(Continued)

*Primary Examiner* — Robert J Lopata
(74) *Attorney, Agent, or Firm* — Ranjeev Singh; Singh Law, PLLC

(57) ABSTRACT

Systems and methods for sending and receiving messages, including training data, using a multi-path packet spraying protocol are described. A method includes segmenting a message into a set of data packets comprising training data. The method further includes initiating transmission of the set of data packets to a receiving node. The method further includes spraying the set of data packets across the switch fabric in accordance with the multi-path spraying protocol such that depending upon a value of a fabric determination field associated with a respective data packet, the respective data packet can traverse via any one of a plurality of paths offered by the switch fabric for a connection between the sending node to the receiving node. The method further includes initiating transmission of synchronization packets to the receiving node, where unlike the set of data packets, the synchronization packets are not sprayed across the switch fabric.

20 Claims, 10 Drawing Sheets

(56) References Cited

U.S. PATENT DOCUMENTS

| | | | |
|---|---|---|---|
| 10,986,150 B2 | 4/2021 | Ithal et al. | |
| 11,038,993 B2 | 6/2021 | Goel et al. | |
| 11,777,839 B2* | 10/2023 | Sindhu | H04L 45/24 |
| | | | 370/235 |
| 2009/0296704 A1* | 12/2009 | Kim | H04L 45/24 |
| | | | 370/389 |
| 2016/0308754 A1* | 10/2016 | Morandin | H04L 45/24 |
| 2017/0187629 A1 | 6/2017 | Shalev et al. | |
| 2018/0241688 A1* | 8/2018 | Williams, Jr. | H04L 45/24 |
| 2019/0012278 A1* | 1/2019 | Sindhu | G06F 9/546 |
| 2020/0051252 A1* | 2/2020 | Brown | G06F 18/214 |
| 2020/0169513 A1* | 5/2020 | Goel | H04L 69/40 |
| 2020/0314026 A1 | 10/2020 | Sindhu et al. | |
| 2020/0334195 A1 | 10/2020 | Chen et al. | |
| 2021/0075730 A1 | 3/2021 | Palermo et al. | |
| 2021/0075746 A1 | 3/2021 | Frankel | |
| 2021/0092069 A1 | 3/2021 | Musleh et al. | |
| 2021/0176347 A1 | 6/2021 | Goel et al. | |
| 2021/0320820 A1* | 10/2021 | Ruan | H04L 49/602 |
| 2023/0168934 A1* | 6/2023 | Vaka | H04L 67/1097 |
| | | | 718/104 |
| 2023/0169150 A1* | 6/2023 | Ha | G06V 10/22 |
| | | | 382/159 |

OTHER PUBLICATIONS

"International Search Report and Written Opinion Issued in PCT Application No. PCT/US22/042408", Mailed Date: Nov. 22, 2022, 15 Pages.

Bhardwaj, Nisha, "Hash Based ECMP Load Balancing Algorithm", Retrieved From: https://www.talentica.com/blogs/hash-based-ecmp-load-balancing-algorithm/, Dec. 9, 2016, 5 Pages.

Lim, Chansook, "Enhancing Robustness of Per-Packet Load-Balancing for Fat-Tree", In Journal of Applied Sciences, vol. 11, Issue 6, Article 2664, Mar. 17, 2021, 16 Pages.

Lu, et al., "Multi-Path Transport for RDMA in Datacenters", In Proceedings of 15th USENIX Symposium on Networked Systems Design and Implementation, Apr. 9, 2018, pp. 357-371.

Memon, et al., "Novel Multi-Level Dynamic Traffic Load-Balancing Protocol for Data Center", In Journal of Symmetry, vol. 11, Issue 2, Article 145, Jan. 28, 2019, 22 Pages.

Sudbring, et al., "Azure Load Balancer Components", Retrieved From: https://docs.microsoft.com/en-us/azure/load-balancer/components, Jan. 3, 2022, 6 Pages.

Sudbring, et al., "Azure Load Balancer Distribution Modes", Retrieved From: https://docs.microsoft.com/en-us/azure/load-balancer/distribution-mode-concepts, Dec. 28, 2021, 4 Pages.

* cited by examiner

| VERSION | MTYPE = 1 | DMA SHAPE-MEMORY ADDRESS | MEMORY ADDRESS BYTE 4 |
|---|---|---|---|
| MEMORY ADDRESS BYTE 3 | MEMORY ADDRESS BYTE 2 | MEMORY ADDRESS BYTE 1 | MEMORY ADDRESS BYTE 0 |
| BIT-VECTOR | | RECEIVE TAG | RECEIVE BUFFER SIZE |
| RECEIVE BUFFER SIZE | RECEIVE COMPLETE SEMAPHORE | | |
| RECEIVE COMPLETE SEMAPHORE | | | |
| LAST IN-ORDER DATA SEQUENCE NUMBER (LIDSN) | | | |
| LAST IN-ORDER DATA SEQUENCE NUMBER (LIDSN) | | | |

| VERSION | MTYPE = 2 | RESERVED | REMOTE SEMAPHORE |
|---|---|---|---|
| REMOTE SEMAPHORE | | | |
| LAST IN-ORDER DATA SEQUENCE NUMBER (LIDSN) | | | |
| LAST IN-ORDER DATA SEQUENCE NUMBER (LIDSN) | | | |

IN A FIRST MODE: (1) SPRAYING A FIRST SET OF DATA PACKETS ACROSS A SWITCH FABRIC IN ACCORDANCE WITH A MULTI-PATH SPRAYING PROTOCOL SUCH THAT DEPENDING UPON AT LEAST A VALUE OF A FIRST FABRIC DETERMINATION FIELD ASSOCIATED WITH A RESPECTIVE DATA PACKET, THE RESPECTIVE DATA PACKET CAN TRAVERSE VIA ANY ONE OF A PLURALITY OF PATHS OFFERED BY THE SWITCH FABRIC FOR A CONNECTION BETWEEN THE SENDING NODE AND A RECEIVING NODE, AND (2) SENDING SYNCHRONIZATION PACKETS VIA THE SWITCH FABRIC, WHERE UNLIKE THE FIRST SET OF DATA PACKETS, THE SYNCHRONIZATION PACKETS ARE NOT SPRAYED ACROSS THE SWITCH FABRIC

1010

IN A SECOND MODE, DIFFERENT FROM THE FIRST MODE, SENDING A SECOND SET OF DATA PACKETS ACROSS THE SWITCH FABRIC IN ACCORDANCE WITH THE MULTI-PATH SPRAYING PROTOCOL SUCH THAT DEPENDING UPON AT LEAST A SELECTED VALUE OF A SECOND FABRIC DETERMINATION FIELD ASSOCIATED WITH A RESPECTIVE DATA PACKET, THE RESPECTIVE DATA PACKET CAN TRAVERSE VIA EITHER A SELECTED PATH PER CONNECTION OR VIA ANY OF A SUBSET OF A PLURALITY OF PATHS OFFERED BY THE SWITCH FABRIC FOR A CONNECTION BETWEEN THE SENDING NODE TO THE RECEIVING NODE

SENDING AND RECEIVING MESSAGES INCLUDING TRAINING DATA USING A MULTI-PATH PACKET SPRAYING PROTOCOL

BACKGROUND

Data center networks typically include thousands of servers interconnected via switches and routers. Traffic among servers is typically load-balanced using load balancing protocols, such as Equal Cost Multiple-Path (ECMP) protocol. Such load balancing protocols are suitable for routine exchange of messages for handling various storage and compute functions offered by the servers at the data center. Trained neural networks may be used for inference operations related to various artificial intelligence (AI) applications offered by the servers or other machines located within a data center or across data centers.

In some instances, thousands of nodes may handle the various stages of a training pipeline and may communicate gradients to the other nodes. Such nodes may be interconnected via the data center network, including switches and routers, allowing for the various nodes to communicate with each other. Any congestion in the network interconnecting the nodes may impact the communication among the nodes participating in the training. Conventional load balancing techniques may not be suitable for addressing these issues.

Thus, there is a need for methods and systems that alleviate at least some of these issues.

SUMMARY

In one example, the present disclosure relates to a method in a system comprising a plurality of nodes coupled via a switch fabric, where each of the plurality of nodes is configurable for sending or receiving messages using a multi-path spraying protocol. The method may include segmenting a message into a set of data packets comprising training data including gradients or weights for a neural network model. The method may further include a sending node initiating transmission of the set of data packets to a receiving node. The method may further include spraying the set of data packets across the switch fabric in accordance with the multi-path spraying protocol such that depending upon at least a value of a fabric determination field associated with a respective data packet, the respective data packet can traverse via any one of a plurality of paths offered by the switch fabric for a connection between the sending node to the receiving node. The method may further include the sending node initiating transmission of synchronization packets corresponding to the message to the receiving node, where unlike the set of data packets, the synchronization packets are not sprayed across the switch fabric.

In another example, the present disclosure relates to a method in a system comprising a plurality of nodes coupled via a switch fabric, where each of the plurality of nodes is configurable for sending or receiving messages using a multi-path spraying protocol. The method may include in a first mode: (1) spraying a first set of data packets across the switch fabric in accordance with the multi-path spraying protocol such that depending upon at least a value of a first fabric determination field associated with a respective data packet, the respective data packet can traverse via any one of a plurality of paths offered by the switch fabric for a connection between the sending node to a receiving node, and (2) sending synchronization packets via the switch fabric, where unlike the first set of data packets, the synchronization packets are not sprayed across the switch fabric. The method may further include in a second mode, different from the first mode, sending a second set of data packets across the switch fabric in accordance with the multi-path spraying protocol such that depending upon at least a selected value of a second fabric determination field associated with a respective data packet, the respective data packet can traverse via either a selected path per connection or via any of a subset of a plurality of paths offered by the switch fabric for a connection between the sending node and the receiving node.

In yet another example, the present disclosure relates to a system comprising a plurality of nodes coupled via a switch fabric, where each of the plurality of nodes is configurable for sending or receiving messages using a multi-path spraying protocol. The system may include a sending node configured to prepare for transmission a set of data packets comprising training data, including gradients or weights for a neural network model, to a receiving node, where the set of data packets is generated by segmenting a message into the set of data packets, where the set of data packets is sprayed across the switch fabric depending upon at least a value of a fabric determination field associated with a respective data packet in accordance with the multi-path spraying protocol. The system may further include a receiving node configured to: (1) receive the set of data packets and store received data packets directly into a memory associated with a worker configured to process the training data, (2) track the received data packets using a bit-vector, and (3) receive any synchronization packets transmitted by the sending node, where unlike the set of data packets, the synchronization packets are not sprayed across the switch fabric.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 4 shows the format of a synchronization packet header for "Receive Message Notification" to illustrate the operation of the multi-path packet spraying protocol in accordance with one example;

FIG. 5 shows the format of another synchronization packet header for "Receive Complete Semaphore" to illustrate the operation of the multi-path packet spraying protocol in accordance with one example;

FIG. 10 shows a flow chart of another method associated with the multi-path spraying protocol in accordance with one example.

DETAILED DESCRIPTION

Figure 1:
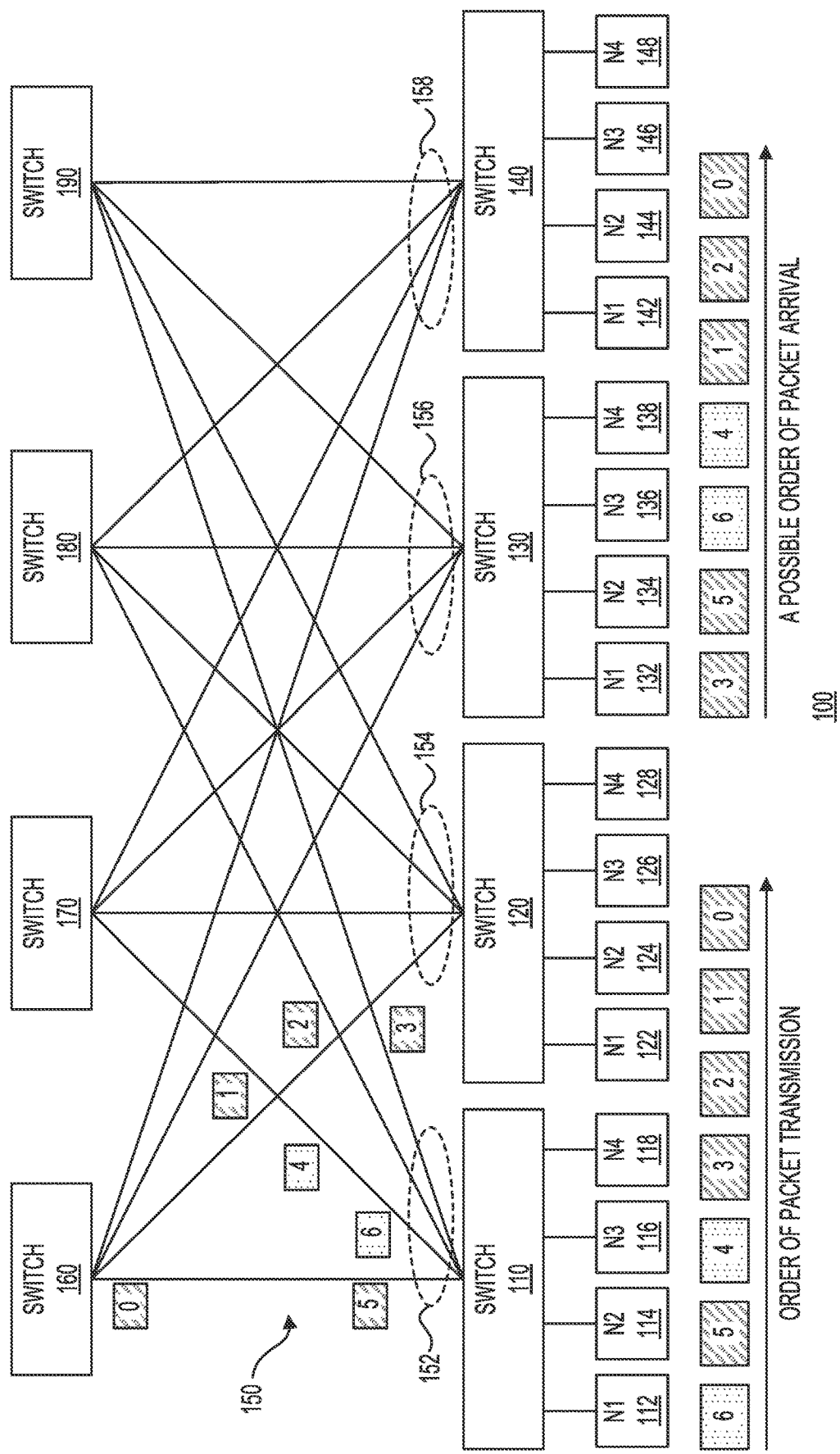
FIG. 1 shows a system including several nodes interconnected via a network to illustrate the operation of the multi-path packet spraying protocol in accordance with one example.

Examples described in this disclosure relate to sending and receiving messages including training data using a multi-path packet spraying protocol. Certain aspects of the present disclosure relate to nodes (e.g., source nodes and destination nodes) using the multi-path packet spraying protocol as part of the network for training of a neural network model. Training of neural network models, such as recursive neural networks (RNNs), convolution neural networks (CNNs), or other types of neural network models requires several steps. As an example, neural network training may include forward propagation, backward propagation, and the updating of the gradients. Such steps may be performed as part of a training pipeline. Moreover, such steps may be performed as part of several epochs. The operations associated with the training pipeline may be executed using distributed nodes performing various steps associated with the training in a pipelined fashion. In some instances, thousands of nodes may be handling the various stages of the training pipeline and may be communicating gradients to the other nodes. Such nodes may be interconnected via the data center network, including switches and routers, allowing for the various nodes to communicate with each other.

Any congestion in the network interconnecting the nodes may impact the communication among the nodes participating in the training. As an example, certain nodes may experience reduced throughput for communicating gradients to the other nodes. Even if a subset of the nodes that are communicating gradients experiences reduced throughput, the training time for the neural network as a whole may be adversely affected. This is because all nodes participating in the next stage of the training may be required to receive the gradients from the other nodes handling the previous stage of the training pipeline prior to advancing to the next stage. Conventional load balancing techniques may not be suitable for addressing these issues.

A source node or a destination node may comprise any of one or more general-purpose central processing units (CPUs), Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices. An image file may be used to configure or re-configure acceleration components such as FPGAs. Information included in an image file can be used to program hardware components of a node (e.g., logic blocks and reconfigurable interconnects of an FPGA) to implement desired functionality. Desired functionality can be implemented to support any service that can be offered via a combination of computing, networking, and storage resources such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

FIG. 1 shows a system 100 including several nodes interconnected via a network 150 to illustrate the operation of the multi-path packet spraying protocol in accordance with one example. Network 150 may allow the traffic to flow along several paths interconnected via switches, such as switches 110, 120, 130, 140, 160, 170, 180, and 190. To illustrate the operation of the multi-path packet spraying protocol, this example shows: switch 110 having a set of paths 152 to switches 160, 170, 180, and 190, switch 120 having a set of paths 154 to switches 160, 170, 180, and 190, switch 130 having a set of paths 156 to switches 160, 170, 180, and 190, and switch 140 having a set of paths 158 to switches 160, 170, 180, and 190. This example further shows nodes N1 112, N2 114, N3 116, and N4 118 coupled to switch 110, nodes N1 122, N2 124, N3 126, and N4 128 coupled to switch 120, nodes N1 132, N2 134, N3 136, and N4 138 coupled to switch 130, and nodes N1 142, N2 144, N3 146, and N4 148 coupled to switch 140. In one example, each of switches 110, 120, 130, and 140 may be implemented as a Top-of-Rack (ToR) switch. In this manner, each ToR switch may aggregate traffic flows from the nodes coupled to it. Thus, switch 110 may aggregate all traffic flow to/from nodes N1 112, N2 114, N3 116, and N4 118. In this example, each of switches 160, 170, 180, and 190 may be implemented as switches that may receive the traffic flows from switches 110, 120, 130, and 140 and may direct the respective traffic flows to appropriate destination switches (e.g., other switches or other ToR switches). Additional switches may further aggregate and disaggregate traffic, as needed.

To further illustrate the operation of the multi-path packet spraying protocol, this example assumes a subset of the nodes are transmitting messages and another subset of the nodes are receiving messages. These messages may include gradients or other information being transmitted by any of the nodes participating in the training of a neural network, such as a recurrent neural network. The messages may further be segmented into packets prior to transmission.

With continued reference to FIG. 1, in this example, the multi-path packet spraying protocol may be implemented as having two types of packets: data packets and synchronization packets. This example further assumes that the packets are being transmitted from switch 110 and are being received by switch 130. Thus, in this example, nodes N1

112, N2 114, N3 116, and N4 118 that are coupled to switch 110 are transmitting packets derived by segmenting the messages and nodes N1 132, N2 134, N3 136, and N4 138 that are coupled to switch 130 are receiving the packets. The transmitting nodes may be referred to as the source nodes and the receiving nodes may be referred to as the destination nodes. Any of the nodes may transmit or receive and thus act as the source node and/or the destination node. FIG. 1 further shows an example order of packet transmission from switch 110 and a possible order of packet arrival at switch 130. The example packets being transmitted (e.g., as shown being transmitted per the ORDER OF PACKET TRANSMISSION) include both data packets (packets 0, 1, 2, 3, and 5) and synchronization packets (packets 4 and 6). Similarly, the example packets being received (e.g., as shown being transmitted per A POSSIBLE ORDER OF PACKET ARRIVAL) include both data packets (e.g., data packets 0, 1, 2, 3, and 5) and synchronization packets (e.g., synchronization packets 4 and 6). In this example, the data packets may be sprayed such that these data packets may travel from switch 110 to switch 130 via any of the paths coupling the two switches. On the other hand, the synchronization packets are not sprayed. The synchronization packets for a connection are sent in-order. The data packets for the connection, however, need not be sent in-order. As used herein the term "connection" refers to a particular flow of traffic (e.g., packets) across the network from a node to another node. In this example, the data traffic (e.g., data packets) corresponding to the connection is mapped to one or more data paths across a fabric.

Still referring to FIG. 1, in one example, system 100 may correspond to a data center environment that includes a large number of servers, which may be considered as nodes coupled via a data-center network. Although FIG. 1 shows a certain number of components of system 100 arranged in a certain manner, there could be more or fewer number of components arranged differently. As an example, each node may not be directly coupled to a switch; instead, each node may be coupled to an intermediate node, which in turn may be coupled to the switch. The intermediate node may help implement a subset or all of the aspects related to the multi-path packet spraying protocol in terms of mapping of connections to the switch fabric. In addition, various components of system 100 may be implemented using other technologies as well.

Figure 2:
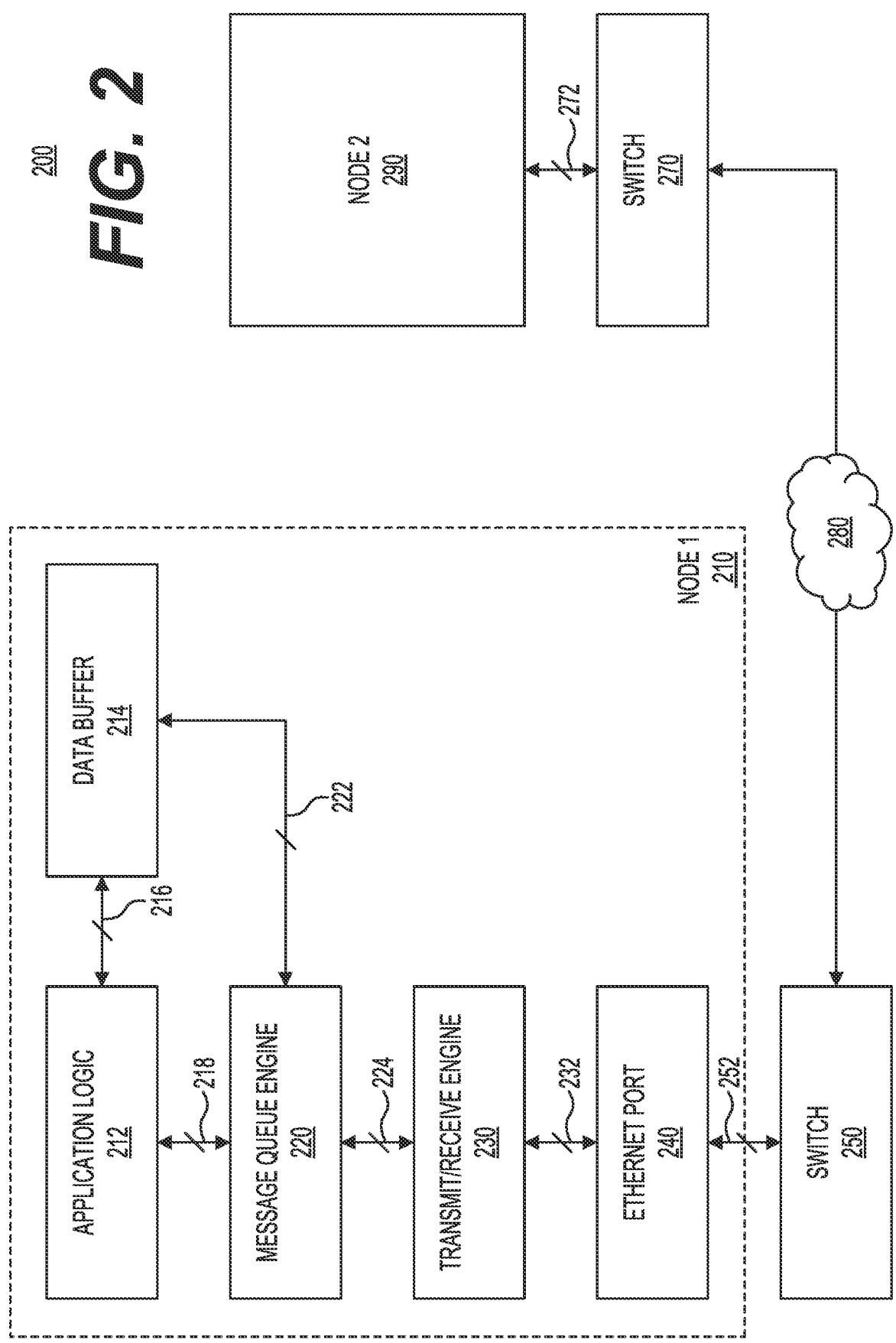
FIG. 2 shows a diagram of a system portion including a source node and a destination node to illustrate the operation of the multi-path packet spraying protocol in accordance with one example.

FIG. 2 shows a diagram of a system portion 200 of system 100 including a source node (e.g., NODE 1 210) and a destination node (e.g., NODE 2 290) to illustrate the operation of the multi-path packet spraying protocol in accordance with one example. Node 1 210 and node 2 290 may be coupled via switch 250 and switch 270 and switch fabric 280. Additional details of node 1 210 are provided with respect to FIG. 2. Node 2 290 may include similar components as shown for node 1 210. Both nodes may transmit and receive messages. In this example, node 1 210 may include application logic 212, data buffer 214, message queue engine 220, transmit/receive engine 230, and Ethernet port 240. Application logic 212 may be coupled via a bus 216 to data buffer 214 and may further be coupled via bus 218 to message queue engine 220. Message queue engine 220, transmit/receive engine 230, and Ethernet port 240 may be provided as part of a network interface controller (NIC). Message queue engine 220 may be coupled via a bus 224 to transmit/receive engine 230, which in turn may be coupled to Ethernet port 240 via a bus 232. Node 1 210 may further be coupled, via Ethernet port 240, to switch 250 via a bus 252.

With continued reference to FIG. 2, application logic 212 may include logic circuits, finite state machines, or other logic and memory to allow an application being executed via node 1 210 to store data in data buffer 214 for transmission to another node. In one example, application logic 212 may be configured to store gradients or other data related to the training of a neural network into data buffer 214. Message queue engine 220 may access the stored data directly from data buffer 214 and provide the data for transmission to transmit/receive engine 230 via bus 224. In one example, application logic 212 and message queue engine 220 may implement zero-copy operations by transferring data directly from the application memory (e.g., data buffer 214) without the data being copied from the application memory to the data buffers associated with an operating system or hypervisor associated with node 1 210. Similarly, the received data may be transferred directly to the application memory (e.g., data buffer 214). The use of zero-copy operations may be advantageous because of the proximity between the application logic and the network, and the removal of the host-based burdens such as navigating a complex network stack, interrupt handling, and resource sharing. In one example, the zero-copy operations may be implemented using Remote Direct Memory Access (RDMA)-based protocols. In one such example, RDMA over Converged Ethernet (RoCE), including either one of RoCEv1 or RoCEv2, may be the selected RDMA-based protocol for use as part of the zero-copy operations. Other technologies and protocols, such as iWARP and InfiniBand may also be used. An application executing via application logic 212 may use any of the appropriate operations to interface with message queue engine 220, which may in turn generate messages and pass those on for further processing by transmit/receive engine 230.

Still referring to FIG. 2, transmit/receive engine 230 may segment the messages into packets and transfer the packets to Ethernet port 240 via a bus 240. In this example, segmenting of the messages may be performed into packets that can be transmitted using the maximum transmission unit (MTU) associated with the physical network, such as the Ethernet. Depending upon the type of physical network technology being used, the size of the packets may vary. Ethernet port 240 may forward the packets to switch 250 via a bus 252, which in turn may transmit the packets to other nodes (e.g., node 2 290 coupled to switch 270) via a switch fabric 280. Additional details concerning the operations associated with transmit/receive engine 230 and switch forwarding logic included in the switches are provided later. Although FIG. 2 shows a certain number of components of system portion 200 of system 100 arranged in a certain manner, there could be more or fewer number of components arranged differently. In addition, various components of system portion 200 of system 100 may be implemented using other technologies as well.

Figure 3:
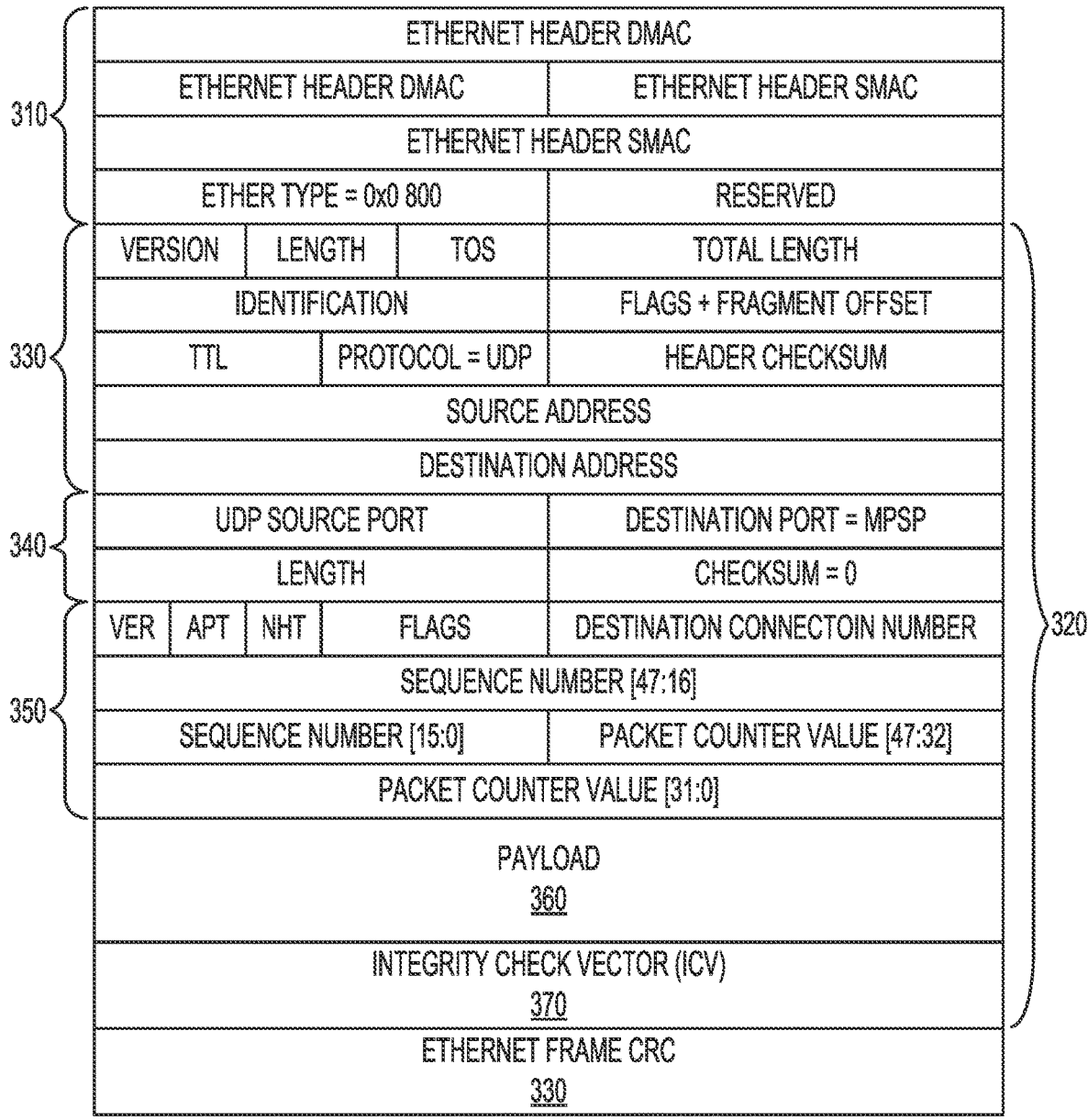
FIG. 3 shows the format of a data packet header to illustrate the operation of the multi-path packet spraying protocol in accordance with one example.

FIG. 3 shows the format of a data packet header 300 to illustrate the operation of the multi-path packet spraying protocol in accordance with one example. Data packet header 300 may be formatted to include several blocks of information, including an Ethernet block 310, an Internet Protocol (IP) block 320, and an Ethernet Frame Cyclic Redundancy Check (CRC) block 330. Ethernet block 310 may include destination media access controller (DMAC) address and source media access controller (SMAC) address. The Ethernet Frame CRC block 330 may be configured to include a value added by the media access controller. Ethernet block 310 may further include a field—ETHER TYPE—to indicate a size of the payload in octets.

In this example, IP block 320 may include: Internet Protocol version 4 (IPv4) header 330 having the various fields associated with the IPv4 header, Unreliable Datagram Protocol (UDP) header 340 having the fields associated with the UDP header, multi-path packet spraying protocol (MPSP) header 350 having the various fields associated with the multi-path packet spraying protocol, payload 360, and integrity check vector (ICV) 370.

With continued reference to FIG. 3, UDP header 340 may include a UDP SOURCE PORT field and a DESTINATION PORT field. The DESTINATION PORT field may be set to a value commensurate with the multi-path packet spraying protocol. In one example, the values of the UDP SOURCE PORT field may be changed to add entropy to the network. Additional details concerning the use of these fields are provided later. MPSP header 350 may include a VER field for storing a value indicative of the version of the protocol, an APT field for indicating a packet type, and an NHT field for indicating the next header type. The APT field may have different values depending upon the packet type (e.g., a data packet type or a synchronization packet type). The NHT field may have different values, including a null value or a value indicating a message header. MPSP header 350 may further include the DESTINATION CONNECTION NUMBER FIELD. In addition, MPSP header 350 may include fields to track the sequence number of the packet (e.g., the SEQUENCE NUMBER field). The sequence number value may be used to keep track of the in-order packets to indicate the last in-order data sequence number (LIDSN). As explained further later, the MPSP receiver may use the LIDSN to detect if any in-order packets were received out of order.

Moreover, MPSP header 350 may include a field to keep track of a packet counter (e.g., the PACKET COUNTER VALUE field). Payload 360 may include the data itself and ICV 370 may include an integrity check vector generated by processing the data included as part of payload 360 to allow for checking the integrity of the data. Payload 360 may be encrypted, if needed. Although FIG. 3 shows a certain format of data packet header 300 including a certain number and a certain arrangement of fields, other arrangements with additional or fewer fields may also be used.

As explained earlier, in one example, the multi-path packet spraying protocol may be implemented as having two types of packets: data packets and synchronization packets. In this example, the multi-path packet spraying protocol may be implemented with two types of synchronization packets to enable two types of synchronization messages: Receive Message Notification and Receive Complete Semaphore. In this example, the Receive Message Notification may indicate to the sender (e.g., any of the source nodes) of a message that the message was received. In this example, the Receive Complete Semaphore message type may act as a control packet that delineates the completion of a message. As an example, if a message had been segmented into four data packets, then the fifth packet may be formatted as a synchronization packet header 400 having the Receive Complete Semaphore packet message type.

FIG. 4 shows the format of a synchronization packet header 400 for "Receive Message Notification" to illustrate the operation of the multi-path packet spraying protocol in accordance with one example. Table 1 below provides additional details concerning the various fields included in synchronization packet header 400.

TABLE 1

| Field Name | Field Width (Bits) | Values and Description |
|---|---|---|
| Version | 4 | 0: Version 0 (specifies the version of the MPSP) |
| Message Type (MType) | 4 | 0: Message Data Packet<br>1: Receive Message Notification<br>2: Receive Complete Semaphore<br>3-15: Reserved |
| "Receive Message Notification" Header Fields | | |
| DMA Shape Memory Address | 16 | DMA Shape memory address in this example, the DMA design supports only 1024 object shapes. Therefore, only ten low order bits of this field are used. Additional bits may be used for a design requiring a larger number of object shapes. |
| Destination Memory Address | 40 | Destination Memory address |
| Bit-Vector | 16 | Specifies the attributes related to the bit-vector, including the bit-vector, size supported by the MPSP version. |
| Receive Tag | 6 | Programmable field to all for up to six tag bits. |
| Receive Buffer Size | 26 | Specifies the size of the Receive Buffer for a node. |
| Receive Complete Semaphore | 64 | Described with respect to FIG. 4. |
| Last "In-Order" Data Sequence Number (LIDSN) | 48 | This field captures the data sequence number of a transmitted "in-order" MPSP data packet sent prior to this packet. |
| "Receive Semaphore" Header Fields | | |
| Reserved | 8 | Set to 0 |
| Remote Semaphore | 64 | A node can send "remote semaphore" to another node. |
| Last "In-Order" Data Sequence Number (LIDSN) | 48 | This field captures the data sequence number of a transmitted "in-order" MPSP data packet sent prior to this packet. |

The functionality corresponding to the fields shown in Table 1 may be combined, or further separated. Certain fields could also be memory indexed by an address or a descriptor field in the Table. Similarly, a special instruction may provide information related to any one of the fields in Table 1 or it may combine the information from such fields. Synchronization packet header 400 has various fields, including the VERSION field and the message type (MTYPE) field. As shown in Table 1, the message type (MTYPE) field is used to specify the synchronization message type—Receive Message Notification or Receive Complete Semaphore—when the packet is not a data packet. In this example, the MTYPE field of synchronization packet header 400 has a value of 1 and thus it relates to Receive Message Notification, which may indicate to the sender (e.g., any of the source nodes) of a message that the message was received. The DMA SHAPE-MEMORY ADDRESS is used as an index to access a look up table that is used to store the shape-memory addresses. The BIT-VECTOR field is also described in Table 1, as specifying attributes for the bit-vector related to the MPSP version. Additional details regarding this field are provided in the context of the description of the MPSP receiver below.

FIG. 5 shows the format of another synchronization packet header 500 for "Receive Complete Semaphore" to illustrate the operation of the multi-path packet spraying protocol in accordance with one example. In this example, the Receive Complete Semaphore message type may act as a control packet that delineates the completion of a message.

As an example, if a message had been segmented into four data packets, then the fifth packet may be formatted as a synchronization packet header 500 having the Receive Complete Semaphore packet message type (MTYPE=2).

In one example, the transmit/receive engine associated with each node (e.g., the nodes described with respect to FIGS. 1 and 2) is configured to transmit packets using a default protocol or the multi-path packet spraying protocol. In this example, a control bit (or another control mechanism) associated with each node allows the transmitter/receiver logic to transmit packets using the default protocol or the multi-path packet spraying protocol. Each connection between a source node and a destination node can be configured using a configuration mechanism, such as a configuration data structure for specifying runtime controllable parameters, including the various parameters associated with the multi-path packet spraying protocol. The configuration data structure may specify the use of the default protocol or the multi-path packet spraying protocol as per the value of the control bit. In this example, based on the specified data via the configuration data structure, the transmit/receive engine may open input/output interfaces for transmitting or receiving packets corresponding to the messages being transmitted or received by a node. Such interfaces may include input queues and output queues. The input queues and output queues, which may be implemented using buffers (e.g., FIFOs), can be used to manage packets being transmitted or received from the Ethernet port (e.g., Ethernet port 240 of FIG. 2).

In one example, the transmit logic, included in the transmit/receive engine (e.g., transmit/receive engine 230 of FIG. 2), is configured to transmit synchronization packets for a particular connection in-order. The data packets for the connection, however, need not be sent in-order. As used herein the term "connection" refers to a particular flow of traffic (e.g., packets) across the network from a node to another node. In this example, the data traffic (e.g., data packets) corresponding to the connection is mapped to one or more data paths across a fabric. In one example, in the context of the training of a neural network, a connection may relate to the flow of traffic between nodes that are using RDMA (or a similar zero-copy operations based technique) to transfer data from one of the nodes to the other node. As part of the connection, each synchronization packet caries the same bits for the fabric path determination (FPD) field per connection. The FPD field may be bits corresponding to one of the UDP Source Port described earlier or a Multi-protocol Label Switching (MPLS) label.

In one example, the transmit logic, included in the transmit/receive engine (e.g., transmit/receive engine 230 of FIG. 2), is configured to transmit data packets out of order. In addition, the data packets may be transmitted as part of a connection based on a value associated with the fabric path determination (FPD) field associated with a data packet. In one example, depending upon a mode associated with the multi-path packet spraying protocol deployed as part of a network or a fabric, the FPD field may carry three possible values. In a first mode (mode 0), the value of the FPD field may be a UDP Source Port selected from a table having a certain number of UDP Source Port values. Each data packet's FPD field may have the value of the selected UDP Source Port Number. In one example, the table may include 128 UDP Source Port values, and any one of them may be selected per connection as the value for the FPD field. In a second mode, the value of the FPD field may be a pseudo random UDP Source Port value for each data packet. The use of a random UDP Source Port value for each packet may result in the spraying of the packets such that different packets may take different paths between a source node and a destination node. In a third mode, the value of the FPD field is changed based on the status of the low order bits associated with a mask value. The mask value may be changed per connection to control the number of distinct UDP Source Port values to be attempted per connection in the following manner. PACKET_UDP_Source_Port= (UDP_ Source_Port & ~Low_Order_Bit_Mask)|(Pseudo_ Random_Number[15:0] & Low_Order_Bit_Mask).

Table 2 below describes one implementation of the mask values and the corresponding effect on the values of the FPD field.

TABLE 2

| Mask Value | Low Order Bit Mask | Description |
| --- | --- | --- |
| 0 | 16'b0000_0000_0000_0000 | All data packets for a connection carry the same FPD value as the in-order packets. |
| 1 | 16'b0000_0000_0000_0001 | Only the lowest bit of the FPD field value is changed. As a result, the data packets for the connection will be sprayed over two randomly selected paths in the fabric. |
| 2 | 16'b0000_0000_0000_0011 | Two of the lowest bits of the FPD field value are changed. As a result, the data packets for the connection will be sprayed over four randomly selected paths in the fabric. |
| 3 | 16'b0000_0000_0000_0111 | Three of the lowest bits of the FPD field value are changed. As a result, the data packets for the connection will be sprayed over eight randomly selected paths in the fabric. |
| 4 | 16'b0000_0000_0000_1111 | Four of the lowest bits of the FPD field value are changed. As a result, the data packets for the connection will be sprayed over sixteen randomly selected paths in the fabric. |
| . . . | | |
| 16 | 16'b1111_1111_1111_1111 | All of the FPD value field bits are changed for each connection. As a result, the data packets will be sprayed over potentially all possible randomly selected paths of the fabric. |

Although Table 2 shows certain mask values and their effect on the FPD field values, other mask values may also be used. Certain fields could also be memory indexed by an address or a descriptor field in the Table. Similarly, a special instruction may provide information related to any one of the fields in Table 2 or it may combine the information from such fields. In this example, with respect to the UDP Source Port as the FPD field, switch-forwarding logic associated with a switch may use the UDP Source Port as one of the input fields to an ECMP hash function. The ECMP hash function may include calculating a modulo <n> hash on header fields associated with the data packet or the synchronization packet. In one example, the hash calculation may include the use of the following fields: SOURCE ADDRESS (e.g., source IP address), DESTINATION ADDRESS (e.g., destination IP address), PROTOCOL (e.g., UDP), UDP SOURCE PORT, and DESTINATION PORT (e.g., MPSP). Since the value of the UDP Source Port is unchanged per connection for transport of the synchronization packets, a mechanism may be used to update the UDP Source Port field value for a retransmission event associated with the synchronization packets. As an example, in case of a retransmission event, the UDP Source Port field value may be updated for the connection as follows: (udp_sourceport [connection]+1)&0xffff:udp_source_port[connection].

Figure 6:
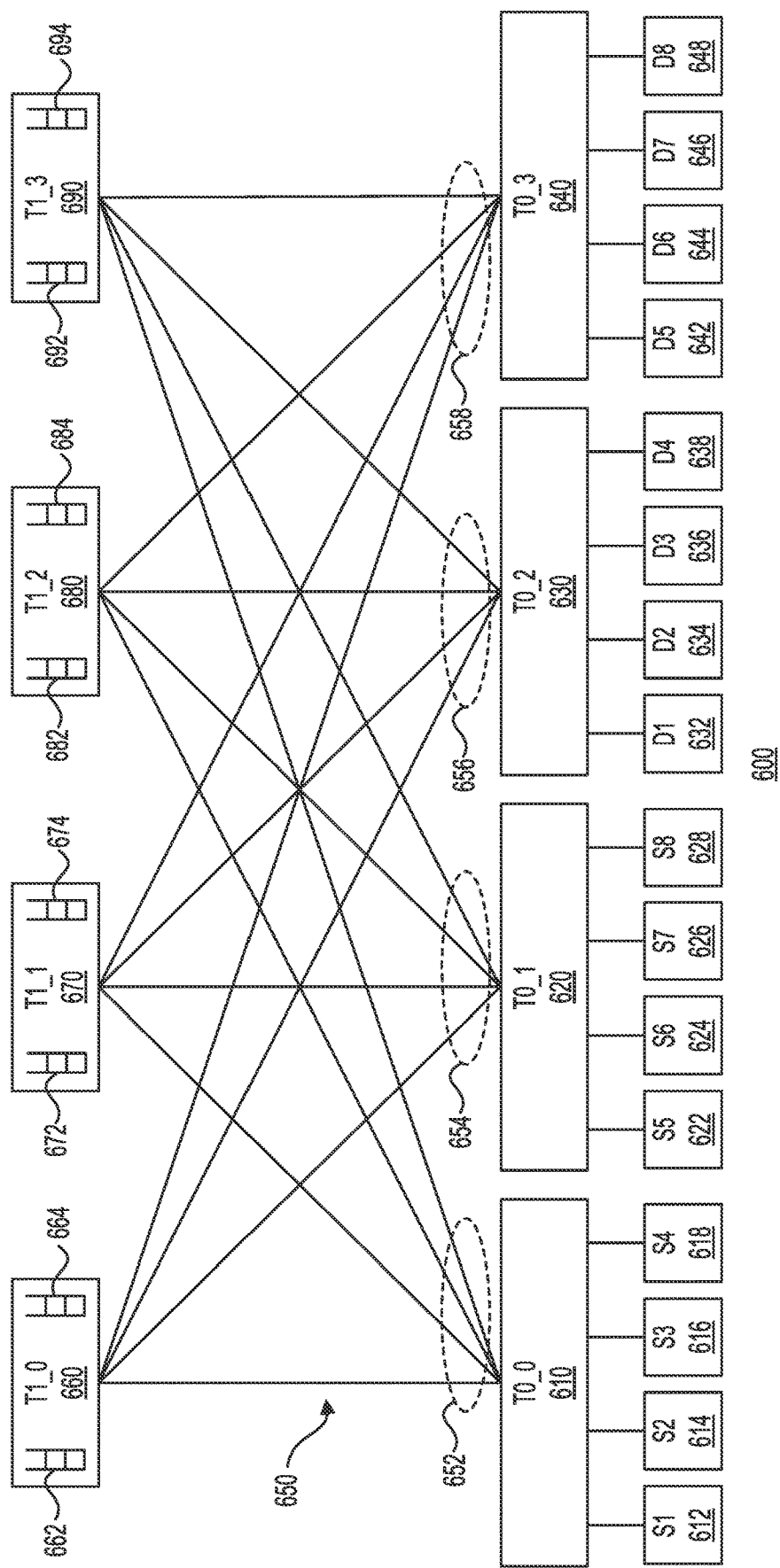
FIG. 6 shows an example fabric for implementing the multi-path packet spraying protocol using two tiers of switches and sixteen nodes in accordance with one example.

FIG. 6 shows a system 600 with the traffic being transmitted and received using the multi-path packet spraying protocol in accordance with one example. In this example, system 600 may include two tiers of switches and sixteen nodes. System 600 may include four tier 0 switches (T0_0 610, T0_1 620, T0_2 630, and T0_3 640) and four tier 1 switches (T1_0 660, T1_1 670, T1_2 690, and T1_3 690). Network 650 may allow the traffic to flow along several paths interconnected via switches, such as switches T0_0 610. T0_1 620, T0_2 630, T0_3 640, T1_0 660, T1_1 670, T1_2 680, and T1_3 690. This example further shows two type of nodes: one set of nodes that are the sender nodes and one set of nodes that are the destination nodes. In this example, sender nodes S1 612, S2 614, S3 616, and S4 618 are coupled to switch T0_0 610 and sender nodes S5 622, S6 624, S7 626, and S8 628 are coupled to switch T0_1 620. Moreover, in this example, destination nodes D1 632, D2 634, D3 636, and D4 638 are coupled to switch T0_2 630 and destination nodes D6 642, D7 644, D8 646, and D9 648 are coupled to switch T0_3 640.

With continued reference to FIG. 6, in one example, each of switches T0_0 610. T0_1 620, T0_2 630, and T0_3 640 may be implemented as a Top-of-Rack (ToR) switch. In this manner, each ToR switch may aggregate traffic flows from the nodes coupled to it. Thus, as an example, switch T0_0 610 may aggregate all traffic flow from source nodes S1 612, S2 614, S3 616, and S4 618. In this example, each of switches T1_0 660, T1_1 670, T1_2 680, and T1_3 690 may be implemented as switches that may receive the traffic flows from switches T0_0 610, T0_1 620, T0_2 630, and T0_3 640 and may direct the respective traffic flows to appropriate destinations. Each of switches T1_0 660, T1_1 670, T1_2 680, and T1_3 690 may include ingress queues and egress queues to buffer the incoming packets and the outgoing packets. In one example, these queues may be implemented using FIFO buffers. As an example, switch T1_0 660 may include a FIFO 662 for an ingress queue and a FIFO 664 for the egress queue, switch T1_1 670 may include a FIFO 672 for an ingress queue and a FIFO 674 for the egress queue, switch T1_2 680 may include a FIFO 682 for an ingress queue and a FIFO 684 for the egress queue, and switch T1_3 690 may include a FIFO 692 for an ingress queue and a FIFO 694 for the egress queue. As explained earlier, the traffic may be forwarded by a respective switch based on the fabric path determination (FPD) field per connection. As described earlier, the FPD field may have bits corresponding to a UDP Source Port or a Multiprotocol Label Switching (MPLS) label. As explained earlier, with respect to the UDP Source Port as the FPD field, the switch-forwarding logic associated with a switch may use the UDP Source Port as one of the input fields to an ECMP hash function. Additional switches may further aggregate and disaggregate traffic, as needed.

In one example, system 600 may be used to train a neural network in a distributed fashion. In one example, a worker (e.g., any, or a combination, of a CPU, a GPU, an IPU, a DSP, or an ASIC accelerator) associated with any one of the nodes takes a subset of the training data (e.g., a mini-batch) and computes the gradients, which are further averaged/reduced to update the model's parameters (e.g., weights). Weight updates are applied after the backpropagation step, which calculates the gradients. As an example, the gradient of a loss function with respect to the weights in the network (or a portion of the network) is calculated. The gradient is then fed to an optimization method that uses the gradient to update the weights to minimize the loss function. The goal with backpropagation is to update each of the weights (or at least some of the weights) in the network so that they cause the actual output to be closer to the target output, thereby minimizing the error for each output neuron and the network as a whole.

System 600 may be used for training neural networks using either data-parallel approach or model-parallel approach and the updates may be either synchronous updates or asynchronous updates. As an example, using the data-parallel approach with synchronous updates, a model may be replicated across N workers (e.g., any, or a combination, of a CPU, a GPU, an IPU, a DSP, or an ASIC accelerator) associated (or included) with the nodes (e.g., the nodes shown in FIG. 6) associated with system 600. A mini-batch of the training samples may be divided into N micro-batches. Each of the N workers may perform a forward pass on the data to compute an error and then perform a backward pass to calculate the gradient for each parameter (e.g., each weight). When any of the N workers finishes either of the pass, it may share updates with the other workers located at other nodes. These updated values may be used to calculate the updated weights of the entire mini-batch.

System 600 may also be used for training data using the model-parallel approach and asynchronous updates. In the model-parallel approach, the model is divided across N workers (e.g., any, or a combination, of a CPU, a GPU, an IPU, a DSP, or an ASIC accelerator) associated (or included) with the nodes (e.g., the nodes shown in FIG. 6) associated with system 600, with each worker holding a part of the model. As one example implementation, each worker may hold a layer of the neural network model, and the information required for training may be passed between devices during the forward and the backward passes. In each of the data-parallel and the model-parallel training scenarios, information is shared among the nodes in system 600. In one example, as part of system 600, all of the packets carrying the training data (e.g., updated weights or gradients) are sprayed such that data from a sender node may be sent by a tier 0 switch to any of the paths that may connect the sender node to a destination node based on the entropy encoded in the packets by the transmitter/receiver logic associated with the sender node. This may advantageously result in the packets, including retransmitted packets, being able to take any number of different data paths unlike a conventional system in which the retransmitted packets may attempt to take the same path as used by the earlier transmitted packets. In such a conventional system, if a path is congested or has other issues, the connection may not allow for the transfer of data (e.g., gradients or weights) resulting in the path transitioning to an error state. Such an interruption of even one path may result in the entire training job restarting causing significant degradation for the training applications. As part of system 600, however, the retransmitted data packets may take a different path in the fabric with a high-probability allowing for the training job to continue despite network issues.

Although FIG. 6 shows a certain number of components of system 600 arranged in a certain manner, there could be more or fewer number of components arranged differently. As an example, each node may not be directly coupled to a switch; instead, each node may be coupled to an intermediate node, which in turn may be coupled to the switch. The intermediate node may help implement a subset or all of the aspects related to the multi-path packet spraying protocol in terms of mapping of connections to the switch fabric. In addition, various components of system 600 may be implemented using other technologies as well.

Figure 7:
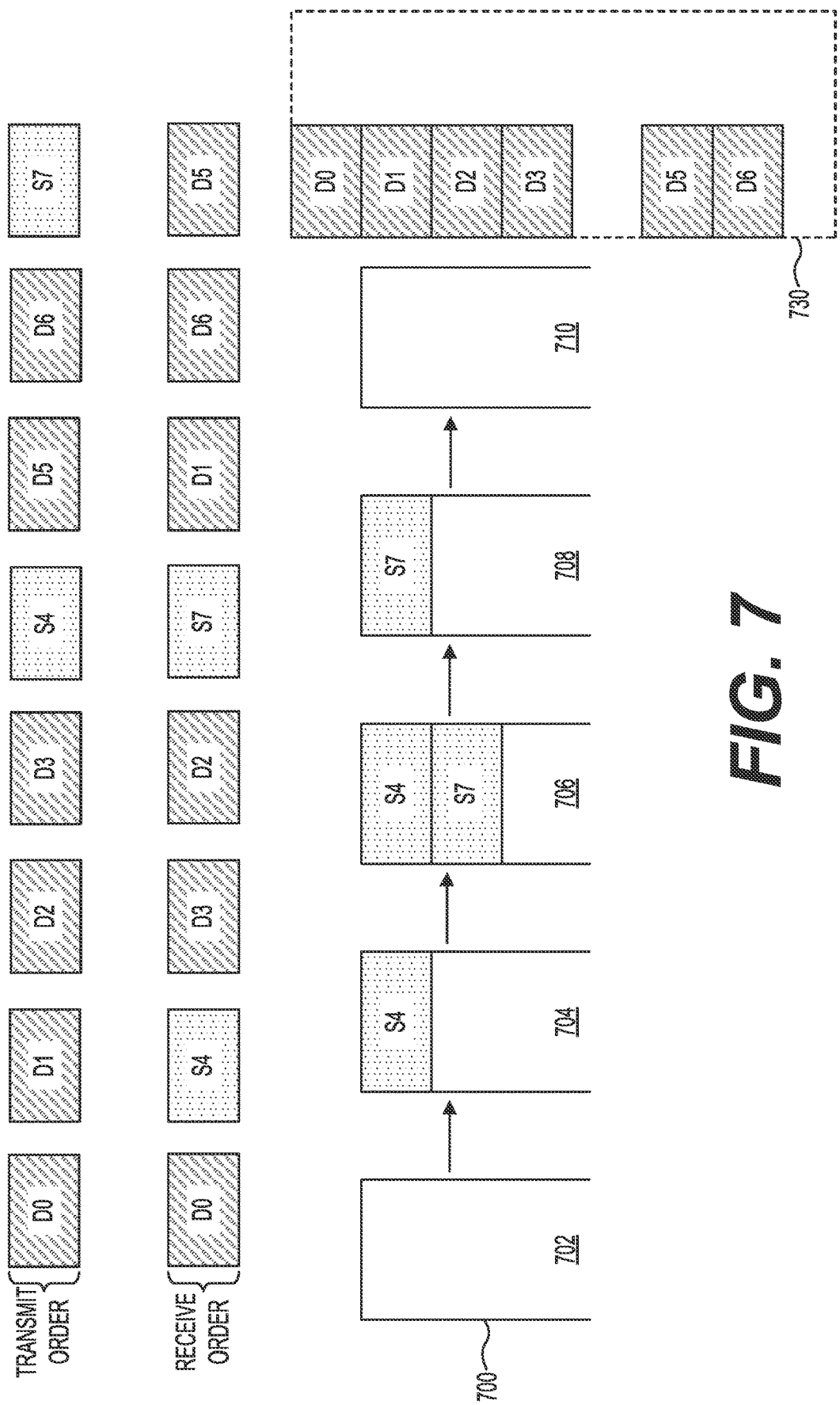
FIGS. 7 and 8 illustrate the processing of packets (data packets and synchronization packets) received using the multi-path packet spraying protocol in accordance with one example.
Figure 8:
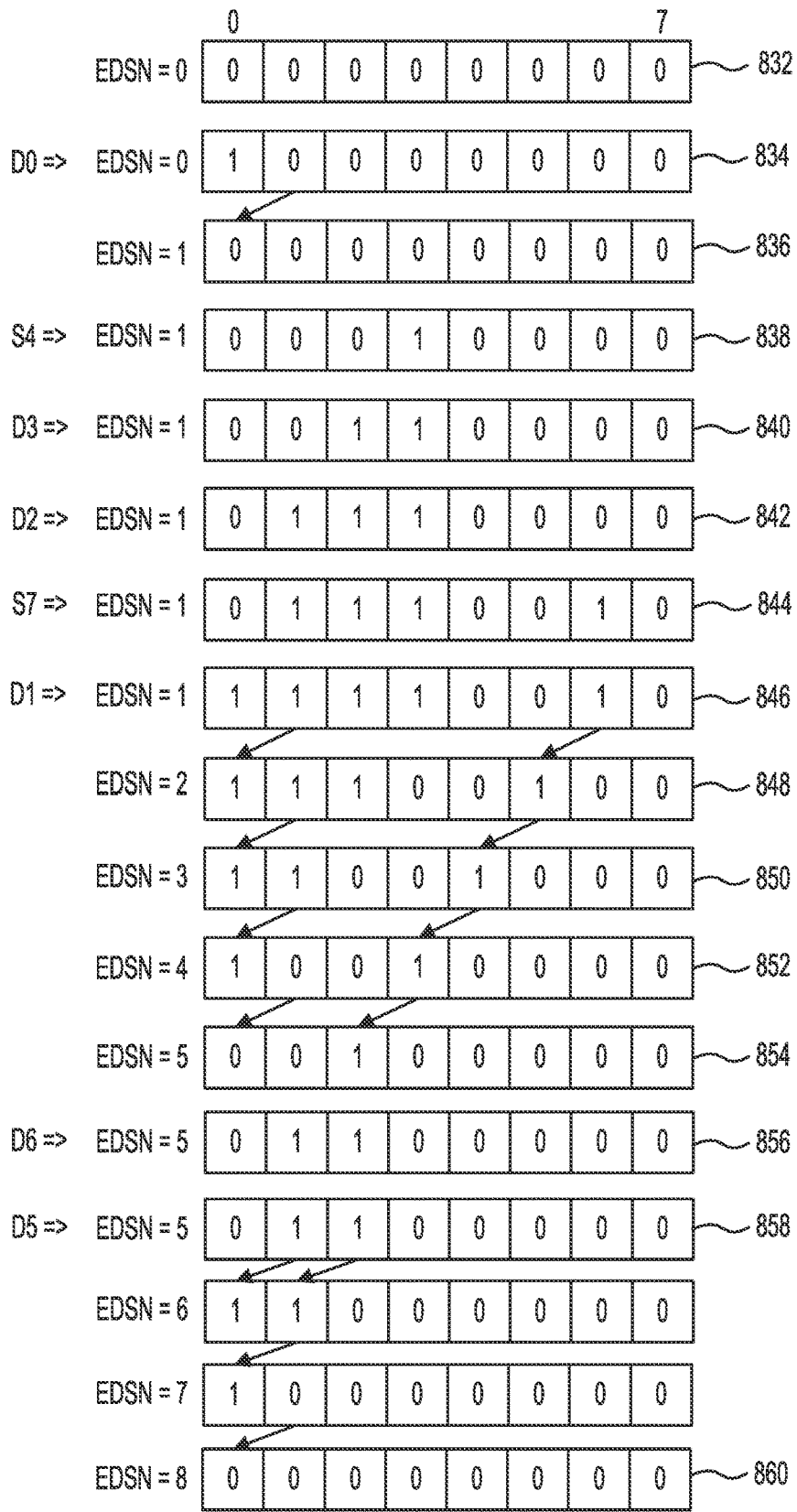

FIGS. 7 and 8 illustrate the processing of packets (data packets and synchronization packets) received using the multi-path packet spraying protocol in accordance with one example. In this example, a receiver, implemented as part of transmitter/receiver engine 230, may perform steps related to the receiving of the packets. As an example, data packets (e.g., D0, D1, D2, D3, D4, D5, and D6) and synchronization packets (e.g., S4 and S7) may be transmitted by a transmitter in the TRANSMIT ORDER shown in FIG. 7. The data packets and the synchronization packets may be received in the RECEIVE ORDER shown in FIG. 7. The receiver may include an in-order packet FIFO 700, which may be configured to store the synchronization packets in order of their receipt. The receiver may further access a memory 730 associated with the node that is receiving the data packets. As the data packets are received, they may be stored directly into memory 730 associated with the worker configured to process at least one aspect of the training pipeline. In one example, each data packet may include a memory address (e.g., as shown in FIG. 3) and that address may be used to store the data packet at the respective address.

FIG. 8 shows example states 800 of a bit-vector that may be used to keep track of the packets. The bit-vector may be used to track the sequence numbers (e.g., the expected data sequence number (EDSN)) associated with the data packets, and this may obviate the need for a packet data re-ordering buffer requiring a large amount of memory. In this example, the concept of the bit-vector is explained using a shift register to track the packets. In this example, states 800 reflect a sliding window view of a shift register per connection. In this example, states 800 reflect a state of the EDSN offsets associated with received packets. The initial state 832 of the shift register is set to 0 for the packets being tracked. As and when a packet is received, the incoming packet's EDSN offset is updated. As an example, when data packet D6 is received, the EDSN offset (6–5=1) is updated. As shown in state 834, once the data packet D0 is received, bit 0 is set to 1, and the shift register is shifted to the left by 1 bit. Data packet D0 itself is stored directly into memory 730. The next EDSN is 1, but no data packet is received, so state 836 still shows all bits being set to 0. State 838 shows bit 3 as being set in response to the receipt of synchronization packet S4. The synchronization packets may be stored in in-order packet FIFO upon arrival and then sent to the control logic associated with the node. As an example, FIG. 7 shows five states of in-order FIFO 700 to illustrate the temporary storage of the synchronization packets that are transmitted in-order by the transmitter. At stage 704, synchronization packet S4 is received and is stored in in-order FIFO 700.

With continued reference to FIGS. 7 and 8, state 840 represents the shift register as having bit 2 set to 1 because of the receipt of data packet D3, which is also stored into memory 710. State 842 represents the shift register as having bit 1 set to 1 because of the receipt of data packet D2, which is also stored into memory 710. State 844 shows the shift register as having bit 6 set to 1 because of the receipt of the synchronization packet S7, which is also stored in in-order FIFO 700 (stage 706). State 846 represents the shift register as having bit 1 set to 1 because of the receipt of data packet D1, which is also stored into memory 710. Once four data packets (e.g., data packets D1, D2, D3, and D4) in the sequence are received, synchronization packet S4 is popped from in-order FIFO 700 (stage 708) and is sent to the upper level software associated with the protocol for further processing. As an example, a RECEIVE COMPLETE SEMAPHORE may be sent by the receiver to the sending node. Similarly, once synchronization packet S7 is popped from in-order FIFO 700, a RECEIVE COMPLETE SEMAPHORE may be sent by the receiver to the sending node. States 848, 850, 852, and 854 show as no bits being set because no data packets or synchronization bits are received. State 856 shows the shift register as having bit 5 set to 1 because of the receipt of data packet D6, which is also stored into memory 710. State 858 shows the state of shift register upon receipt of data packet D5, which is also stored into memory 710. As bits are shifted to the left, state 860 shows the state of shift register as having all 0 bits. Although FIG. 8 shows a certain size of shift register and a certain number of states 800 associated with the shift register, the shift register may have other sizes and states. In addition, the Receive Complete Semaphore messages need not be generated every time a complete message has been received by the receiver. Instead, in one example, the receiver may generate a single Receive Complete Semaphore message with a count field that includes the count of the packets received by the receiver. Either mode may be selected by setting a mode bit associated with the receiver.

In one example, as part of the multi-path packet spraying protocol 128 connections for each node may be tracked using 1024 bits per connection. The bits corresponding to such a bit-vector may be implemented as a dynamically shared memory across connections with a static minimum number of allocated bits per connection. The size of the bit-vector may depend upon the selected number of the maximum out of order packets per connection. If the sequence number of the received packet exceeds the most recently received packet's expected data sequence number (EDSN) plus the size of the bit-vector (e.g., the maximum length of a shift register, when used as the bit-vector), then that packet may be discarded.

Figure 9:
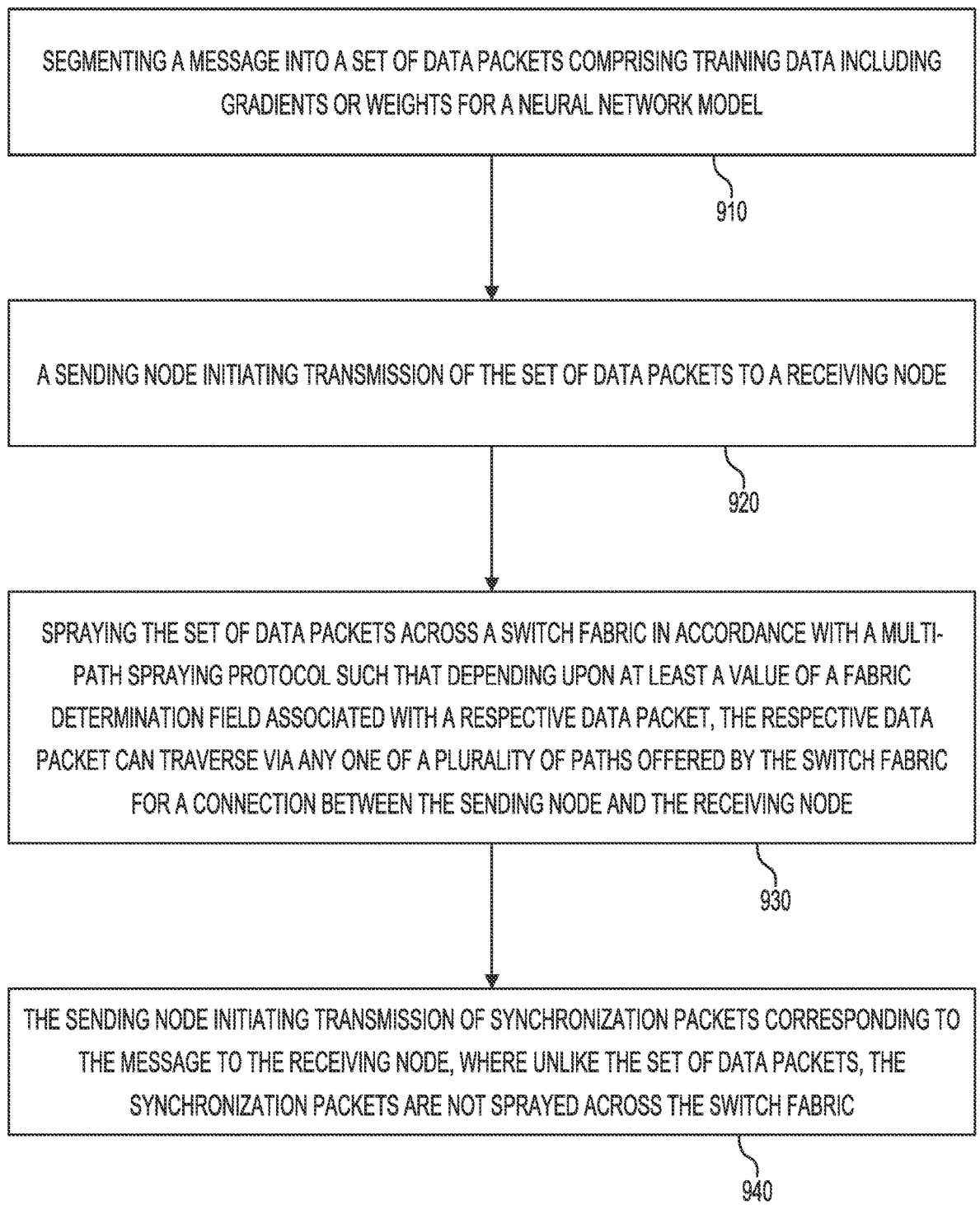
FIG. 9 shows a flowchart of a method associated with the multi-path spraying protocol in accordance with one example.

FIG. 9 shows a flow chart 900 of a method associated with the multi-path spraying protocol in accordance with one example. Step 910 may include segmenting a message into a set of data packets comprising training data including gradients or weights for a neural network model. In one example, transmit/receive engine 230 of FIG. 2 may segment the message into packets, including data packets and synchronization packets. As explained earlier, the segmenting process may generate packets that can be transmitted using the underlying physical network, such as Ethernet.

Step 920 may include initiating by a sending node, transmission of the set of data packets to a receiving node. As part of this step, in one example, the sending node by using transmit/receive engine 230 of FIG. 2 may initiate transmission of the set of data packets. As explained earlier, depending on the mode of operation associated with the multi-path spraying protocol, the data packets may be processed differently on a per data packet basis.

Step 930 may include spraying the set of data packets across the switch fabric in accordance with the multi-path spraying protocol such that depending upon at least a value of a fabric determination field associated with a respective data packet the respective data packet can traverse via any one of a plurality of paths offered by the switch fabric for a connection between the sending node to the receiving node. In one example, the switch forwarding logic associated with the switch (e.g., switch 250 of FIG. 2) may spray the set of data packets across the switch fabric. As explained earlier, in one of the operating modes (e.g., the second mode described earlier), the value of the fabric path determination (FPD) field may be a pseudo random UDP Source Port value for each data packet. The use of a random UDP Source Port value for each packet may result in the spraying of the packets such that different packets may take different paths between a source node and a destination node. As further explained earlier, the FPD field need not be the bits corresponding to the UDP Source Port described; instead, the FPD field may include bits corresponding to a Multiprotocol Label Switching (MPLS) label. Additional details regarding spraying are provided with respect to FIGS. 6-8.

Step 940 may include initiating by the sending node, transmission of synchronization packets corresponding to the message to the receiving node, where unlike the set of data packets, the synchronization packets are not sprayed across the switch fabric. In one example, the switch forwarding logic associated with the switch (e.g., switch 250 of FIG. 2) may forward the synchronization packets such that they are not sprayed across the switch fabric. As part of the connection, each synchronization packet caries the same bits for the fabric path determination (FPD) field per connection. As further explained earlier, the FPD field may have bits corresponding to a UDP Source Port or a Multiprotocol Label Switching (MPLS) label. With respect to the UDP Source Port as the FPD field, switch-forwarding logic associated with a switch may use the UDP Source Port as one of the input fields to an ECMP hash function. Although FIG. 9 shows a certain number of steps listed in a certain order, there could be fewer or more steps and such steps could be performed in a different order. In addition, although the steps shown in FIG. 9 are described as being performed by certain functionality associated with certain components, such functionality may be combined or distributed across one or more components.

FIG. 10 shows a flowchart 1000 of another method associated with the multi-path spraying protocol in accordance with one example. Step 1010 may include in a first mode: (1) spraying a first set of data packets across the switch fabric in accordance with the multi-path spraying protocol such that depending upon at least a value of a first fabric determination field associated with a respective data packet, the respective data packet can traverse via any one of a plurality of paths offered by the switch fabric for a connection between the sending node to a receiving node, and (2) sending synchronization packets via the switch fabric, where unlike the first set of data packets, the synchronization packets are not sprayed across the switch fabric. In one example, transmit/receive engine 230 of FIG. 2 may segment the message into packets, including data packets and synchronization packets. As explained earlier, the segmenting process may generate packets that can be transmitted using the underlying physical network, such as Ethernet. In one example, the switch forwarding logic associated with the switch (e.g., switch 250 of FIG. 2) may spray the first set of data packets across the switch fabric. As explained earlier, in one of the operating modes (e.g., the second mode described earlier), the value of the fabric path determination (FPD) field may be a pseudo random UDP Source Port value for each data packet. The use of a random UDP Source Port value for each packet may result in the spraying of the packets such that different packets may take different paths between a source node and a destination node. As further explained earlier, the FPD field need not be the bits corresponding to the UDP Source Port described; instead, the FPD field may include bits corresponding to a Multiprotocol Label Switching (MPLS) label. Additional details regarding spraying are provided with respect to FIGS. 6-8. In one example, the switch forwarding logic associated with the switch (e.g., switch 250 of FIG. 2) may forward the synchronization packets such that they are not sprayed across the switch fabric. As part of the connection, each synchronization packet caries the same bits for the fabric path determination (FPD) field per connection. As further explained earlier, the FPD field may have bits corresponding a UDP Source Port or a Multiprotocol Label Switching (MPLS) label. With respect to the UDP Source Port as the FPD field, switch-forwarding logic associated with a switch may use the UDP Source Port as one of the input fields to an ECMP hash function.

With continued reference to FIG. 10, step 1020 may include in a second mode, different from the first mode, sending a second set of data packets across the switch fabric in accordance with the multi-path spraying protocol such that depending upon at least a selected value of a second fabric determination field associated with a respective data packet, the respective data packet can traverse via either a selected path per connection or via any of a subset of a plurality of paths offered by the switch fabric for a connection between the sending node to the receiving node. As explained earlier, in one of the operating modes (the first mode described earlier), the value of the FPD field may be a UDP Source Port selected from a table having a certain number of UDP Source Port values. Each data packet's FPD field may have the value of the selected UDP Source Port Number. In one example, the table may include 128 UDP Source Port values, and any one of them may be selected per connection as the value for the FPD field. As explained earlier in another mode (the third mode described earlier), the value of the FPD field is changed based on the status of the low order bits associated with a mask value. The mask value may be changed per connection to control the number of distinct UDP Source Port values to be attempted per connection. In one example, the switch forwarding logic associated with the switch (e.g., switch 250 of FIG. 2) may forward the synchronization packets such that they are not sprayed across the switch fabric. As part of the connection, each synchronization packet caries the same bits for the fabric path determination (FPD) field per connection. As further explained earlier, the FPD field may be bits corresponding to one of the UDP Source Port described earlier or a Multiprotocol Label Switching (MPLS) label. With respect to the UDP Source Port as the FPD field, switch-forwarding logic associated with a switch may use the UDP Source Port as one of the input fields to an ECMP hash function. Although FIG. 10 shows a certain number of steps listed in a certain order, there could be fewer or more steps and such steps could be performed in a different order. In addition, although the steps shown in FIG. 10 are described as being performed by certain functionality associated with certain components, such functionality may be combined or distributed across one or more components.

In conclusion, the present disclosure relates to a method in a system comprising a plurality of nodes coupled via a switch fabric, where each of the plurality of the nodes is configurable for sending or receiving messages using a multi-path spraying protocol. The method may include segmenting a message into a set of data packets comprising training data including gradients or weights for a neural network model. The method may further include a sending node initiating transmission of the set of data packets to a receiving node. The method may further include spraying the set of data packets across the switch fabric in accordance with the multi-path spraying protocol such that depending upon at least a value of a fabric determination field associated with a respective data packet, the respective data packet can traverse via any one of a plurality of paths offered by the switch fabric for a connection between the sending node to the receiving node. The method may further include the sending node initiating transmission of synchronization packets corresponding to the message to the receiving node, where unlike the set of data packets, the synchronization packets are not sprayed across the switch fabric.

The value of the fabric determination field may comprise one of a value of the unreliable datagram protocol (UDP) source port or a multiprotocol label switching (MPLS) label. The method may further include, at the receiving node, directly storing received data packets into a memory associated with a worker configured to process the training data.

The method may further include, at the receiving node, tracking the received data packets using a bit-vector. The method may further include, at the receiving node, processing received synchronization packets using an in-order first-in-first-out (FIFO) buffer.

As part of the method, each of the set of data packets is transmissible across the switch fabric in an out of order fashion, and each of the synchronization packets is transmissible only in an in-order fashion. The method may further include using zero-copy operations, transferring the training data directly to the switch fabric from a memory associated with a worker configured to process the training data. Any of the steps summarized above could be performed in any combination and in any order to realize the advantages associated with the present disclosure, including the packets being able to take any number of different data paths across the switch fabric unlike a conventional system in which the retransmitted packets may attempt to take the same path as used by the earlier transmitted packets.

In another example, the present disclosure relates to a method in a system comprising a plurality of nodes coupled via a switch fabric, where each of the plurality of the nodes is configurable for sending or receiving messages using a multi-path spraying protocol. The method may include in a first mode: (1) spraying a first set of data packets across the switch fabric in accordance with the multi-path spraying protocol such that depending upon at least a value of a first fabric determination field associated with a respective data packet, the respective data packet can traverse via any one of a plurality of paths offered by the switch fabric for a connection between the sending node to a receiving node, and (2) sending synchronization packets via the switch fabric, where unlike the first set of data packets, the synchronization packets are not sprayed across the switch fabric. The method may further include in a second mode, different from the first mode, sending a second set of data packets across the switch fabric in accordance with the multi-path spraying protocol such that depending upon at least a selected value of a second fabric determination field associated with a respective data packet, the respective data packet can traverse via either a selected path per connection or via any of a subset of a plurality of paths offered by the switch fabric for a connection between the sending node and the receiving node.

In one example, each of the value of the first fabric determination field and the value of the second fabric determination field comprises one of a value of the unreliable datagram protocol (UDP) source port or a multiprotocol label switching (MPLS) label. The method may further include, at the receiving node, tracking the received data packets using a bit-vector. The method may further include, at the receiving node, processing received synchronization packets using an in-order first-in-first-out (FIFO) buffer.

In this method, each of the first set of data packets and the second set of data packets may be transmissible across the switch fabric in an out of order fashion, and each of the synchronization packets may be transmissible only in an in-order fashion.

In yet another example, the present disclosure relates to a system comprising a plurality of nodes coupled via a switch fabric, where each of the plurality of the nodes is configurable for sending or receiving messages using a multi-path spraying protocol. The system may include a sending node configured to prepare for transmission a set of data packets comprising training data, including gradients or weights for a neural network mode, to a receiving node, where the set of data packets is generated by segmenting a message into the set of data packets, where the set of data packets is sprayed across the switch fabric depending upon at least a value of a fabric determination field associated with a respective data packet in accordance with the multi-path spraying protocol. The system may further include a receiving node configured to: (1) receive the set of data packets and store received data packets directly into a memory associated with a worker configured to process the training data, (2) track the received data packets using a bit-vector, and (3) receive any synchronization packets transmitted by the sending node, where unlike the set of data packets, the synchronization packets are not sprayed across the switch fabric.

The value of the fabric determination field may comprise one of a value of the unreliable datagram protocol (UDP) source port or a multiprotocol label switching (MPLS) label. The receiving node may further be configured to directly store received data packets into a memory associated with a worker configured to process the training data.

The receiving node may further be configured to track the received data packets using a bit-vector. The receiving node may further be configured to process received synchronization packets using an in-order first-in-first-out (FIFO) buffer.

As part of this system, each of the set of data packets may be transmissible across the switch fabric in an out of order fashion, and each of the synchronization packets is transmissible only in an in-order fashion. The sending node may be configured to, using zero-copy operations, transfer the training data directly to the switch fabric from a memory associated with a worker configured to process the training data.

The switch fabric may comprise at least two tiers of switches interconnected to each other such that the respective data packet can traverse via any one of a plurality of paths offered by the switch fabric for a connection between the sending node and the receiving node. Any of the system components summarized above could be combined, or distributed, in any manner to realize the advantages associated with the present disclosure, including the packets being able to take any number of different data paths across the switch fabric unlike a conventional system in which the retransmitted packets may attempt to take the same path as used by the earlier transmitted packets.

It is to be understood that the systems, methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a device, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a system comprising a plurality of nodes coupled via a switch fabric, wherein each of the plurality of the nodes is configurable for sending or receiving messages using a multi-path spraying protocol, and wherein the method comprising:
   segmenting a message into a set of data packets comprising training data including gradients or weights for a neural network model;
   a sending node initiating transmission of the set of data packets to a receiving node;
   spraying the set of data packets across the switch fabric in accordance with the multi-path spraying protocol such that depending upon at least a value of a fabric determination field associated with a respective data packet, the respective data packet can traverse via any one of a plurality of paths offered by the switch fabric for a connection between the sending node and the receiving node; and
   the sending node initiating transmission of synchronization packets corresponding to the message to the receiving node, wherein unlike the set of data packets, the synchronization packets are not sprayed across the switch fabric.

2. The method of claim 1, wherein the value of the fabric determination field comprises one of a value of the unreliable datagram protocol (UDP) source port or a multiprotocol label switching (MPLS) label.

3. The method of claim 1, further comprising at the receiving node, directly storing received data packets into a memory associated with a worker configured to process the training data.

4. The method of claim 3, further comprising at the receiving node, tracking the received data packets using a bit-vector.

5. The method of claim 1, further comprising at the receiving node, processing received synchronization packets using an in-order first-in-first-out (FIFO) buffer.

6. The method of claim 1, wherein each of the set of data packets is transmissible across the switch fabric in an out of order fashion, and wherein each of the synchronization packets is transmissible only in an in-order fashion.

7. The method of claim 1, further comprising using zero-copy operations, transferring the training data directly to the switch fabric from a memory associated with a worker configured to process the training data.

8. A method in a system comprising a plurality of nodes coupled via a switch fabric, wherein each of the plurality of the nodes is configurable for sending or receiving messages using a multi-path spraying protocol, and wherein the method comprising:
   in a first mode: (1) spraying a first set of data packets across the switch fabric in accordance with the multi-path spraying protocol such that depending upon at least a value of a first fabric determination field associated with a respective data packet, the respective data packet can traverse via any one of a plurality of paths offered by the switch fabric for a connection between the sending node to a receiving node, and (2) sending synchronization packets via the switch fabric, wherein unlike the first set of data packets, the synchronization packets are not sprayed across the switch fabric;

in a second mode, different from the first mode, sending a second set of data packets across the switch fabric in accordance with the multi-path spraying protocol such that depending upon at least a selected value of a second fabric determination field associated with a respective data packet, the respective data packet can traverse via either a selected path per connection or via any of a subset of a plurality of paths offered by the switch fabric for a connection between the sending node and the receiving node.

9. The method of claim 8, wherein each of the value of the first fabric determination field and the value of the second fabric determination field comprises one of a value of the unreliable datagram protocol (UDP) source port or a multiprotocol label switching (MPLS) label.

10. The method of claim 8, further comprising at the receiving node, tracking received data packets using a bit-vector.

11. The method of claim 8, further comprising at the receiving node, processing received synchronization packets using an in-order first-in-first-out (FIFO) buffer.

12. The method of claim 8, wherein each of the first set of data packets and the second set of data packets is transmissible across the switch fabric in an out of order fashion, and wherein each of the synchronization packets is transmissible only in an in-order fashion.

13. A system comprising a plurality of nodes coupled via a switch fabric, wherein each of the plurality of the nodes is configurable for sending or receiving messages using a multi-path spraying protocol, and wherein the system further comprising:

a sending node configured to prepare for transmission of a set of data packets comprising training data, including gradients or weights for a neural network model, to a receiving node, wherein the set of data packets is generated by segmenting a message into the set of data packets, wherein the set of data packets is sprayed across the switch fabric depending upon at least a value of a fabric determination field associated with a respective data packet in accordance with the multi-path spraying protocol; and a receiving node configured to: (1) receive the set of data packets and store received data packets directly into a memory associated with a worker configured to process the training data, (2) track the received data packets using a bit-vector, and (3) receive any synchronization packets transmitted by the sending node, wherein unlike the set of data packets, the synchronization packets are not sprayed across the switch fabric.

14. The system of claim 13, wherein the value of the fabric determination field comprises one of a value of the unreliable datagram protocol (UDP) source port or a multiprotocol label switching (MPLS) label.

15. The system of claim 13, wherein the receiving node is further configured to directly store received data packets into a memory associated with a worker configured to process the training data.

16. The system of claim 15, wherein the receiving node is further configured to track the received data packets using a bit-vector.

17. The system of claim 13, wherein the receiving node is further configured to process received synchronization packets using an in-order first-in-first-out (FIFO) buffer.

18. The system of claim 13, wherein each of the set of data packets is transmissible across the switch fabric in an out of order fashion, and wherein each of the synchronization packets is transmissible only in an in-order fashion.

19. The system of claim 13, wherein the sending node is configured to, using zero-copy operations, transfer the training data directly to the switch fabric from a memory associated with a worker configured to process the training data.

20. The system of claim 13, wherein the switch fabric comprises at least two tiers of switches interconnected to each other such that the respective data packet can traverse via any one of a plurality of paths offered by the switch fabric for a connection between the sending node and the receiving node.

* * * * *